United States Patent [19]
Kwon

[11] Patent Number: 6,104,697
[45] Date of Patent: *Aug. 15, 2000

[54] ETHERNET HAVING DATA TRANSFER RATE DETECTING FUNCTION

[75] Inventor: Ki Jo Kwon, Kyungki-do, Rep. of Korea

[73] Assignee: LG Semicon Co., Ltd., Chungcheongbuk-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/633,534

[22] Filed: Apr. 17, 1996

[30] Foreign Application Priority Data

Nov. 24, 1995 [KR] Rep. of Korea ............... 95-43482

[51] Int. Cl.[7] .................................. H04L 12/42
[52] U.S. Cl. ................ 370/232; 370/253; 370/465
[58] Field of Search .................. 370/229, 230, 370/231, 232, 233, 234, 252, 253, 465, 468, 914; 375/224, 225; 340/825.06

[56] References Cited

U.S. PATENT DOCUMENTS

| | | | |
|---|---|---|---|
| 3,718,763 | 2/1973 | Abramson et al. | 370/914 |
| 4,882,726 | 11/1989 | Lang et al. | 370/914 |
| 5,115,429 | 5/1992 | Hluchyj et al. | 370/232 |
| 5,282,203 | 1/1994 | Ocuchi | 370/232 |
| 5,703,872 | 12/1997 | Boggs et al. | 370/465 |

OTHER PUBLICATIONS

IEEE, 802.3u, Chapter 28. Physical Layer link signaling for 10 Mb/s and 100Mb/s Auto–Negotiation on twisted pair, pp. 235 to 280.

*Primary Examiner*—Ricky Ngo
*Attorney, Agent, or Firm*—Finnegan, Henderson, Farabow, Garrett & Dunner, L.L.P.

[57] ABSTRACT

An Ethernet having an automatic detecting function of data transfer rate to efficiently manage the Ethernet, comprising a medium access controller for controlling Ethernet transfer protocol; a detector for automatically detecting a rate of data transfer received from a communication medium and driving said medium access controller to automatically control a transceiving path according to data transfer rate; an encoder/decoder enabled according to a transmitting/receiving mode selection by said medium access controller for encoding/decoding data to be suitable for the transfer protocol during data transceiving; and a data transceiver enabled according to a transmitting/receiving mode selection by said medium access controller and for transmitting and/or receiving the data to and/or from the communication medium during the data transceiving.

6 Claims, 2 Drawing Sheets

ETHERNET HAVING DATA TRANSFER RATE DETECTING FUNCTION

BACKGROUND OF THE INVENTION

The present invention relates to an Ethernet, and more particularly, to an Ethernet having an automatic detecting function of data transfer rate to efficiently manage the Ethernet.

Generally, the Ethernet monitors lines during data transfer between stations and transfers data only when a network is not busy. Here, when the transferred data of one station interferes with that of another station, the Ethernet recognizes the transfer failure and retries the data transfer to complete communication.

Thus, to reduce such collision, the occupation or busy status of a channel is detected prior to initiating the data transfer and the data transfer is delayed at least until a current carrier is available or in other words a busy signal disappears. Since a controller transferring the data can simultaneously receive the data being transferred by itself, interference can be quickly detected by comparing the transferred data and the received data.

Referring to FIG. 1, a conventional Ethernet will now be described.

The conventional Ethernet comprises a medium access controller 1 for controlling 10 Mbps/100 Mbps Ethernet protocol, an encoder/decoder 2 for encoding NRZ (Non-Return to Zero) data to Manchester data corresponding to a data transfer rate during transceiving and decoding of the Manchester data to NRZ data, and a data transceiver portion 3 for transmitting the encoded data by adjusting a data level according to the characteristics of a communication medium, i.e., paper tape, cards, and magnetic tape, and transferring the data received from the communication medium to a decoder block of the encoder/decoder 2.

In a conventional Ethernet with such structure, a 10 Mbps or 100 Mbps control signal is generated by an internal register of the medium access controller 1 by software or hardware. When selecting a mode by software, a set-up program and an external $E^2PROM$ can be used as a setting method. When the mode is selected by hardware, a user can select the mode by manipulating select pins for 10 Mbps and 100 Mbps.

First, when the 10 Mbps mode is selected, a medium access controller 1 enables 10 Mbps data transceiving paths of encoder/decoder 2 and data transceiver 3, and disables 100 Mbps data transceiving paths. Accordingly, when transmitting, data to be transferred to the communication medium via a host interface is input into the medium access controller 1, and data frame operation is performed in the medium access controller 1 in accordance with the transfer protocol.

When the data to be transferred to the communication medium is ready, the data is then transferred to a 10 Mbps encoder block of the encoder/decoder 2. The 10 Mbps encoder block encodes the data according to the transfer protocol of the communication medium and outputs the encoded data to a 10 Mbps transmitting block of the data transceiver 3. Next, the 10 Mbps transmitting block receiving the encoded data adjusts the data level according to the transfer characteristics of the communication medium and transfers the data to the communication medium.

In the meantime, for 10 Mbps data receiving, data of the communication medium is received by a 10 Mbps receiving block of the data transceiver 3. The 10 Mbps receiving block converts the data to be suitable for data decoding in a 10 Mbps decoder block of the encoder/decoder 2 and transfers the converted data to the 10 Mbps decoder block. The 10 Mbps decoder block decodes the transferred data from the 10 Mbps receiving block along with a sync clock signal and a receiving enable signal and transfers the decoded data to the medium access controller 1.

Here, medium access controller 1 analyzes a frame of the transferred data and determines which data among the data received from the communication medium is received by itself, that is, data corresponding to an intrinsic address of the medium access controller 1. The data determined to be received by that particular medium access controller 1 is transferred from the communication medium along with an intrinsic address designating the location for accessing that data. Thus, only data with intrinsic address of the medium access controller 1 is received and the received data is transferred through the host interface.

On the other hand, when the 100 Mbps mode is selected, similar to the case when 10 Mbps mode is selected, the medium access controller 1 enables 100 Mbps data transceiving paths of encoder/decoder 2 and data transceiver 3, and disables 10 Mbps data transceiving paths.

However, in a conventional Ethernet, a user needs to construct and set up a control signal for mode selection by software or hardware according to the receiving signal rate. Thus, when an installer constructing the network or a user does not know the receiving signal rate, the control signal set-up is rendered impossible.

SUMMARY OF THE INVENTION

To solve the above problem, it is an object of the present invention to provide an Ethernet having an automatic detecting function of the data transfer rate in which the receiving signal rate is automatically detected and thus the mode selection is automatically made without additional structure for mode selection.

Accordingly, to achieve the above object, there is provided an Ethernet having an automatic detecting function of data transfer rate comprising a medium access controller for controlling Ethernet transfer protocol; a detector for automatically detecting a rate of data transfer received from a communication medium and driving said medium access controller to automatically control a transceiving path according to data transfer rate; an encoder/decoder enabled according to a transmitting/receiving mode selection by said medium access controller for encoding/decoding data to be suitable for the transfer protocol during data transceiving; and a data transceiver enabled according to a transmitting/receiving mode selection by said medium access controller and for transmitting and/or receiving the data to and/or from the communication medium during the data transceiving.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

Figure 1:
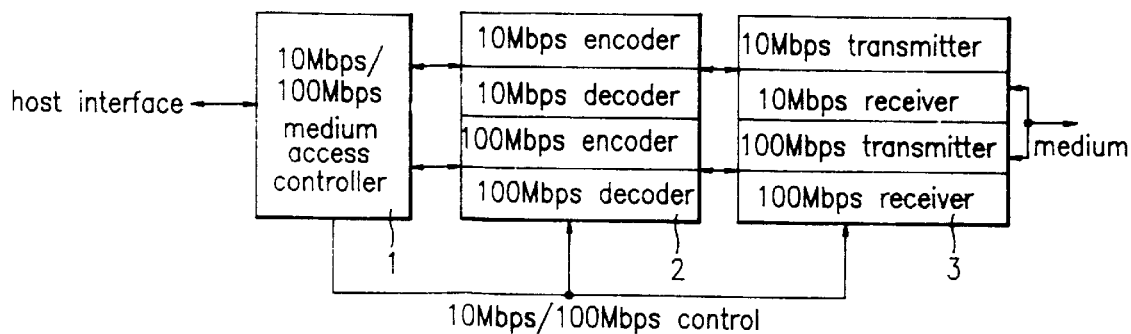
FIG. 1 is a block diagram illustrating a structure of a conventional Ethernet.
Figure 2:
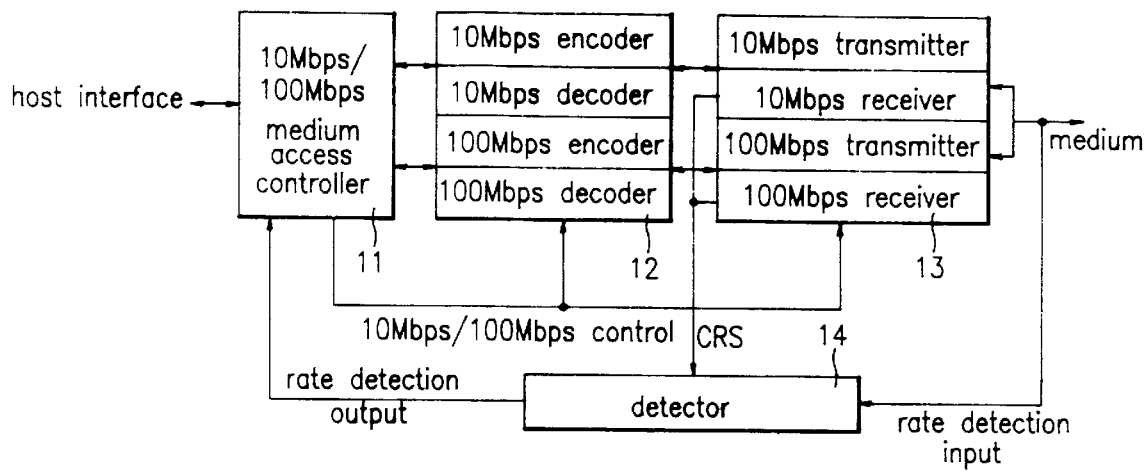
FIG. 2 is a block diagram illustrating a structure of an Ethernet according to the present invention.

Referring to FIG. 2, an Ethernet having an automatic detecting function of data transfer rate according to the present invention comprises a medium access controller 11 for controlling Ethernet protocol including a 10 Mbps/100 Mbps mode switching, an encoder/decoder 12 for encoding NRZ (Non-Return to Zero) data to Manchester data corresponding to data transfer rate during transceiving and decoding of the Manchester data to NRZ data, a data transceiver 13 including a transmitting block for transmitting the encoded data by adjusting data level according to the characteristics of a communication medium and a receiving block for transferring the data received from the communication medium to a decoder block of the encoder/decoder 12, and a detector 14 for automatically detecting a receiving signal rate of the data received from the communication medium and outputting a rate detection signal by which mode selection is controlled by the medium access controller 11 according to a corresponding rate.

The operation of the Ethernet having such structure will now be described, referring to FIGS. 2, 3, and 4.

Figure 3:
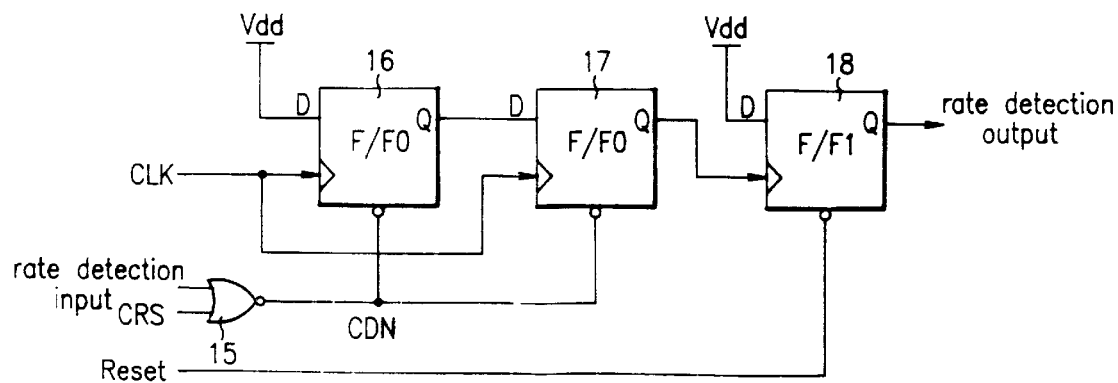
FIG. 3 is a block diagram illustrating in detail a detector of the present invention.

As shown in FIG. 2, when there is data received from the communication medium, levels of both a CRS (Carrier Sensor) signal output from the receiving block of the data transceiver 13 and a rate detection input (In) become "high." That is, as shown in FIG. 3, when there is receiving data, the levels of the rate detection input (In) and a signal output from the receiving block of the data transceiver 13 become "high." Accordingly, CDNs (Collision Detection Negative input) of first and second D flip-flops (D F/F) 16 and 17 connected with an output of a NOR gate 15 become "low," and so, outputs (Q) of the first and second D F/F 16 and 17 maintain a "low" state.

Figure 4A:
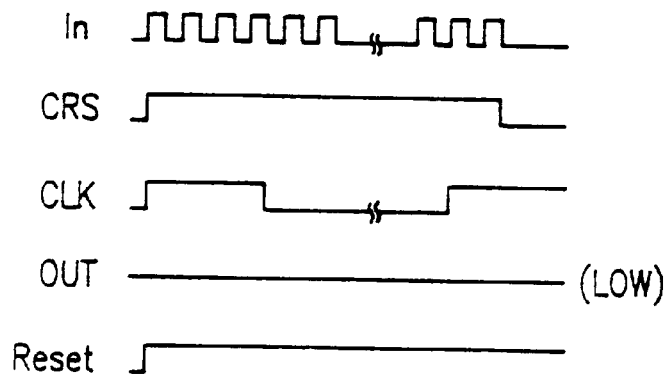
FIGS. 4A–4C are timing diagrams of the detector of FIG. 3 in operation.

Here, the output of the second D F/F 17 is used as a clock signal to a third D F/F 18. However, since the output (Q) of the second D F/F 17 is low, there is no clock signal by the third D F/F 18. Since the third D F/F 18 is initialized by a reset port, the output (Q) of the third D F/F 18 maintains a low state. The above operation timing is shown in FIG. 4A.

Figure 4B:
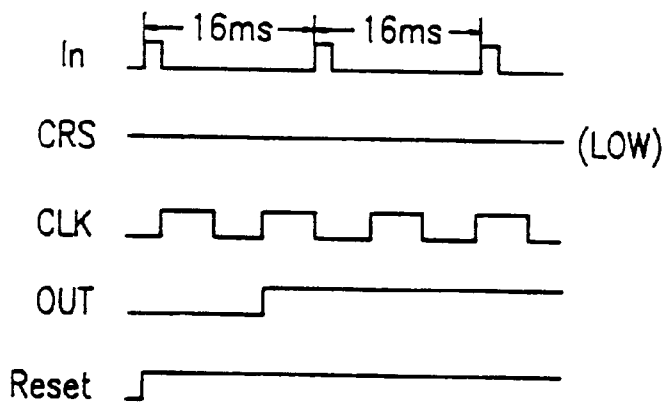

Meanwhile, when there is no receiving data, the rate detection input signal (In) having a positive edge is input every 16 ms in the 10 Mbps Ethernet and every 1.6 ms in the 100 Mbps. That is, as shown in FIG. 4B, the In is input every 16 ms in case of the 10 Mbps and the CRS signal output from the receiving block becomes a low level.

Here, when the clock signal operates two cycles within a period of 16 ms where the rate detection input signal is input, output of the second D F/F 17 of FIG. 3 operates the third D F/F 18 and thus, the final rate detection output becomes a high level. Here, the period of the clock signal must be shorter than 16 ms.

Figure 4C:
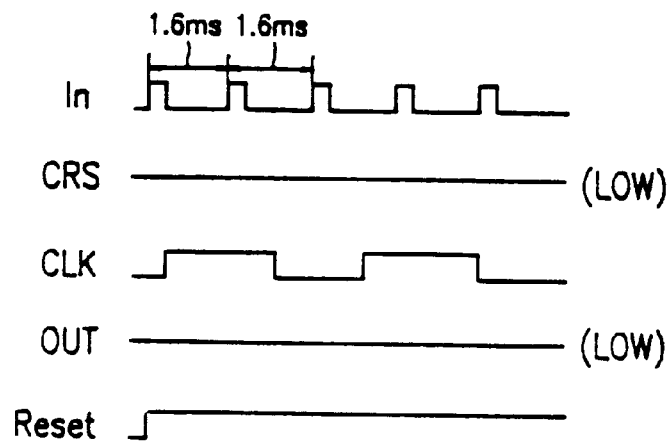

Then, in case of the 100 Mbps, as shown in FIG. 4C, the In having a positive edge every 1.6 ms is input. Accordingly, to maintain the output (Q) of the third D F/F in a low state, the clock must not operate over 2 cycles within a 1.6 ms period and the CDN must be a low state. So, a clock is generated whose frequency range is in a period between 1.6 ms and 16 ms.

Consequently, since the rate detection output signal output by detector 14 differs depending on the data transfer rate, medium access controller 11 outputs a mode control signal in response to the detection output signal input by the detector 14 for enabling the encoder/decoder block and the data transceiving block corresponding to each data transfer rate, thereby realizing a data transceiving path according to the rate of the received signal.

In other words, the medium access controller 11 selects a mode according to the rate detection output signal of the detector 14, and the frame work is performed to transfer the data via the host interface according to the transfer protocol. The processed data is transferred to the encoder/decoder 12 corresponding to the selection mode. The encoder block corresponding to the selection mode encodes the data according to the transfer protocol and transfers the encoded data to the transmitting block of the data transceiver 13 corresponding to the selection mode.

Next, the data encoded according to the transfer protocol is transmitted by the transmitting block to the communication medium after the data level is adjusted suitable for the characteristics of the communication medium.

Meanwhile, during data receiving, data transferred from the communication medium is input into the data receiving block of the transceiver 13 corresponding to the selection mode. The data is then adjusted to be suitable for the corresponding decoder block of the encoder/decoder 12 and transferred to the decoder block. The data is first decoded by the decoder block along with a clock signal and a receiving enable signal which are synchronized with the data transferred from the decoder block and then transferred to the medium access controller 11. Here, the medium access controller 11 only receives data congruous with the intrinsic address among the received data and transfers the received data via the host interface.

As described above, in the Ethernet having a data transfer rate detecting function, the rate of the received signal is automatically detected to thereby select a mode automatically without additional software or hardware for the mode selection. Therefore, the Ethernet can be efficiently managed.

What is claimed is:

1. An Ethernet having a rate of transfer of data detecting function comprising:

a medium access controller for controlling a transfer protocol between a host and a communication medium;

a detector for detecting a rate of transfer of data received from the communication medium and enabling said medium access controller to control said transfer protocol according to the data transfer rate;

an encoder/decoder for encoding/decoding said data according to said transfer protocol; and a data transceiver for transmitting or receiving said data according to said transfer protocol.

2. An Ethernet as recited in claim 1, wherein said detector comprises a plurality of D flip-flops and a logic gate and outputs a rate detection output signal according to a determination of whether there is received data from said data transceiver and a data transfer rate detection input signal received from said communication medium.

3. A method of selecting the data transfer protocol of an Ethernet comprising the steps of:

detecting a data receiving rate signal of data transferred from a communication medium to a data transceiver;

processing the detected data receiving rate signal with a CRS signal from a receiving block of said data transceiver for generating a rate detection signal and transmitting the rate detection signal to a medium access controller; and enabling a transfer protocol between a host and the communication medium corresponding to the rate detection signal received by the medium access controller.

4. A method of claim 3 wherein the enabling step comprises:

selecting an encoder/decoder corresponding to a transfer protocol of the rate detection signal; and selecting a transceiver corresponding to a transfer protocol of the rate detection signal.

5. A system for selecting the data transfer protocol of an Ethernet comprising:

a detector for detecting a data receiving rate signal of data transferred from a communication medium to a data transceiver and providing a rate detection signal based on said data receiving rate signal;

a medium access controller for selecting a transfer protocol in response to the rate detection signal;

a plurality of sets of encoders/decodes, one set of said plurality being enabled by the medium access controller, for encoding/decoding the data corresponding to the transfer protocol; and a plurality of transceivers, one of said plurality being enabled by the medium access controller, for transceiving the data corresponding to the transfer protocol.

6. A system of claim 5, wherein the detector comprises a plurality of D flip-flops and a logic gate to process the data receiving rate signal with a CRS signal from a receiving block of the transceiver.

* * * * *